United States Patent

Moscony et al.

Patent Number: 5,718,874
Date of Patent: Feb. 17, 1998

[54] SOLVENT EXTRACTION METHOD OF SEPARATING FERRIC CHLORIDE FROM NICKEL CHLORIDE

[75] Inventors: John Joseph Moscony; Barry Michael Cushman, both of Lancaster, Pa.

[73] Assignee: Thomson Consumer Electronics, Inc., Indianapolis, Ind.

[21] Appl. No.: 770,108

[22] Filed: Dec. 19, 1996

[51] Int. Cl.$^6$ .............................. C22B 23/00; C22B 61/00
[52] U.S. Cl. ........................................................ 423/139
[58] Field of Search .................................... 423/139

[56] References Cited

U.S. PATENT DOCUMENTS

| | | | |
|---|---|---|---|
| 3,085,054 | 4/1963 | Thornhill | 423/139 |
| 3,374,090 | 3/1968 | Fletcher et al. | 75/97 |
| 3,446,720 | 5/1969 | Brooks | 204/112 |
| 3,607,236 | 9/1971 | Brooks et al. | 423/139 |
| 3,725,527 | 4/1973 | Yamamura et al. | 423/139 |
| 3,824,161 | 7/1974 | Ane et al. | 423/139 |
| 3,988,224 | 10/1976 | Barriere et al. | 423/139 |
| 4,016,054 | 4/1977 | Gandon et al. | 423/139 |
| 4,261,959 | 4/1981 | Kim et al. | 423/139 |
| 4,389,279 | 6/1983 | Weber et al. | 156/640 |
| 4,396,475 | 8/1983 | Stehlik | 204/130 |
| 4,420,366 | 12/1983 | Oka et al. | 156/644 |
| 4,472,236 | 9/1984 | Tanaka et al. | 156/642 |
| 4,482,426 | 11/1984 | Maynard et al. | 156/640 |

FOREIGN PATENT DOCUMENTS

| | | | |
|---|---|---|---|
| 1483155 | 11/1970 | Germany | 423/139 |
| 4-2792 | 1/1992 | Japan | |

OTHER PUBLICATIONS

ERAMET-SLN (Bulletin), 6 pages, no date.
The technical and economic aspects of producing high-purity cobalt and nickel from superalloy scrap utilizing a double-membrane electrolytic cell.

*Primary Examiner*—Steven Bos
*Attorney, Agent, or Firm*—Joseph S. Tripoli; Dennis H. Irlbeck; Vincent J. Coughlin, Jr.

[57] ABSTRACT

Ferric chloride is separated from nickel chloride in a spent etchant solution 10 using a solvent extractant system 12. An extractant solution 14 is mixed with an HCl solution 16 to form an aqueous layer 18 and an organic extractant 20. The organic extractant 20 is introduced into an extraction section 22 of the system 12 and mixed with a recycled, stripped organic solvent 32 and a first raffinate 34 to form a first mixture 36 which is separated into a first organic layer 38 and a Ni-containing aqueous layer 40. A feed solution 44 consisting of the spent etchant solution 10 and concentrated HCl is combined with the first organic layer 38 to form a second mixture 46 which is separated into the first raffinate 34 and an organic solution 47 having a high concentration of iron. The solution 47 is introduced into a stripping section 48 of the system 12 and mixed with a raffinate 58 to form a third mixture 60 which is separated into a partially stripped organic layer 62 and an aqueous ferric chloride solution 64. A second HCl solution 66 is combined with the organic layer 62 to form a fourth mixture 68 which is separated into the organic solvent 32 and the raffinate 58. The aqueous ferric chloride solution 64 is processed 70 to provide either a concentrated ferric chloride etchant solution 72 in a continuous system 13, or a dried ferric chloride salt 74, in a non-continuous system.

4 Claims, 6 Drawing Sheets

Fig. 4
EXTRACTION ISOTHERM

Fig. 5

SOLVENT EXTRACTION METHOD OF SEPARATING FERRIC CHLORIDE FROM NICKEL CHLORIDE

The present invention relates to a liquid-liquid solvent extraction method for separating ferric chloride from nickel chloride in a spent etchant used in manufacturing metal parts made of a nickel-iron alloy, such as INVAR™ or 42 alloy.

BACKGROUND OF THE INVENTION

The use of INVAR™ (36% Ni, 64% Fe) in shadow masks has increased significantly in recent years with the growth in demand for high performance color picture tubes and color display tubes. INVAR™ is preferred for shadow mask making because it has a relatively low thermal coefficient of expansion and greater structural strength than low-carbon steel. Thus, an INVAR™ shadow mask exhibits less dimensional change when it is heated during tube operation and also can be made from thinner strip material than conventional masks.

The shadow mask is ordinarily made in several steps including producing etch-resistant stencils on opposite surfaces of a flat INVAR™ strip and, then, etching through openings in the stencil with a ferric chloride etchant to form apertures in the mask material. Then, the flat mask is removed from the strip and formed into the desired shape. When shadow masks are made from INVAR™, the nickel ion ($Ni^{2+}$) concentration of the etchant solution gradually increases at a rate dependent on the etching conditions. Because nickel chloride is inactive as an etchant, and the $Ni^{2+}$ ion is not changed to a higher oxidation state by chlorine gas, the etching rate of the etchant gradually decreases, thereby reducing mask productivity as the nickel ion concentration increases. Additionally, the increase in nickel ion concentration in the etchant also results in an increase in metal surface roughness with a resultant decrease in mask aperture acuity. Eventually, the spent etchant, having a concentration of nickel chloride in excess of about 5%, must be replaced with fresh ferric chloride to restore the activity of the etchant. Such a spent ferric chloride etchant replacement method is described in U.S. Pat. No. 4,482,426, issued on Nov. 13, 1984, to Maynard et al. However, the down-time necessary to replace the spent etchant, and the expense of disposing of a waste solution, containing both nickel chloride and ferric chloride, necessitates finding a method for recovering the ferric chloride from the spent etchant.

Liquid-liquid solvent extraction is a separation technique that involves a chemical reaction in which a metal ion of interest is transferred from an aqueous phase into an organic phase by means of an organic reagent. The metal ion is then stripped from the organic phase using water. The basic steps in a liquid-liquid solvent extraction process include: 1) contacting an aqueous feed phase with an immiscible organic extraction phase; 2) extracting metal ion(s) of interest into the organic phase; 3) separating the aqueous phase (raffinate) from the loaded organic phase; 4) contacting the loaded organic phase with the aqueous phase (stripping); 5) separating the stripped aqueous phase metal ion(s) from the organic phase; and 6) recycling the organic phase.

U.S. Pat. No. 4,261,959, issued on Apr. 14, 1981, to Kim et al., describes a liquid-liquid solvent extraction process for extracting ferric ions from an aqueous solution by using 4-methyl-2-pentanone, as the extractant, to obtain essentially complete separation of $Ni^{2+}$ and $Fe^{2+}$ ions from the etchant mixture that also contains $Fe^{3+}$.

An industrial extraction process for treatment of 75% nickel industrial grade matte to produce nickel metal with a purity greater than 99.5% has been developed by ERAMET-SLN. The extraction subjects the finely ground matte to leaching by a solution of ferric chloride in the presence of chlorine in a reactor-decanter-percolator assembly. The nickel, cobalt and iron present in the matte are converted into chlorides. The solution of nickel, cobalt and iron chlorides is then subjected to successive stages of extraction and purification. Iron is extracted first, then the cobalt, and finally the minor impurities, such as chromium, magnesium, aluminum, copper, etc. The iron is extracted by using, as the extractant, tributyl phosphate, which is brought into contact with the solution in a series of mixer-settlers operating in counter-current. During this operation, the tributyl phosphate combines with the ferric chloride which is subsequently recovered by scrubbing with fresh water. At this stage of the extraction process, three types of solution are obtained: a solution of nickel and cobalt chlorides containing no iron, a solution of pure ferric chloride containing all the iron originally present in the matte, and a solution of ferric chloride which is recycled for matte leaching. Next, cobalt is extracted from the solution of nickel and cobalt chlorides, which is now free of iron, using another series of mixer-settlers, and a different extractant, tri-iso octylamine. A solution of pure cobalt chloride and a solution of nickel chloride, which no longer contains cobalt are obtained in this way. The nickel chloride solution is then purified, by selective electrolysis and carbon filtration to remove lead. The purified nickel Chloride solution is then processed using a plurality of electrolysis cells, each of which includes insoluble anodes. Nickel metal is deposited on the cathode sheets of the electrolysis cells. This extraction process is energy intensive and expensive.

A laboratory comparison of the solvent extraction efficiency of tributyl phosphate and 4-methyl-2-pentanone on an INVAR™ waste solution of spent etchant containing nickel chloride in a ferric chloride etch solution was made, using a four-step extraction process. The raffinate remaining after the extraction steps is an aqueous solution which contains mostly nickel. The 4-methyl-2-pentanone extracted 98% of the nickel present in the waste solution, whereas the tributyl phosphate extracted only 63% of the nickel. However, 4-methyl-2-pentanone has a low flash point (13° C.), which raises safety considerations in a manufacturing process. Also, 4-methyl-2-pentanone tends to be present in the stripped ferric chloride and may present problems in reconcentrating the etchant. Additionally, a high concentration of HCl is required in the aqueous feed solution and, therefore, the excess HCl must be removed from the stripped phase.

In view of the drawbacks associated with the use of 4-methyl-2-pentanone and the relatively low extraction efficiency of tributyl phosphate, it is desirable that the above-described industrial extraction process be improved in efficiency for reclaiming an INVAR™ waste solution of spent etchant containing nickel chloride in a ferric chloride etch solution. Such INVAR™ waste solutions contain only about 5% nickel, so that the concentration of ferric chloride is far in excess of nickel chloride. However, such a modification requires that a solvent be identified that could be used to efficiently separate ferric chloride from nickel chloride.

SUMMARY OF THE INVENTION

The novel method of separating ferric chloride from nickel chloride in a spent etchant solution utilizes a solvent extraction system. An extractant solution comprising an active extractant and a diluent is mixed with an HCl solution to form an aqueous layer, which is discarded, and an organic extractant comprising the diluent and a hydrochloride salt of the active extractant. The organic extractant is introduced into an extraction section of the solvent extraction system, comprising a plurality of extraction mixers and extraction settlers, and mixed in one of the plurality of extraction mixers with a stripped organic solvent and a first raffinate from one of the plurality of extraction settlers to form a first mixture. The first mixture is passed to a different one of the plurality of extraction settlers where the first mixture is separated into a first organic layer and a Ni-containing second raffinate. A feed solution consisting of the spent etchant solution and concentrated HCl is formed and introduced into a different one of the plurality of extraction mixers where it is combined with the first organic layer from a different one of the plurality of extraction settlers to form a second mixture. The second mixture is passed into one of the plurality of extraction settlers where it is separated into the first raffinate and a loaded organic solution having a high concentration of iron. The loaded organic solution is introduced into a stripping section of the system comprising a plurality of stripping mixers and stripping settlers. The loaded organic solution is mixed in one of the plurality of stripping mixers with a partially loaded raffinate from one of the plurality of stripping settlers to form a third mixture. The third mixture is passed to a different one of the plurality of stripping settlers wherein the third mixture is separated into a partially stripped organic layer and an aqueous ferric chloride solution. A 1N HCl solution is formed and introduced, along with the partially stripped organic layer, into a different one of the plurality of stripping mixers to form a fourth mixture. The fourth mixture is passed to one of the plurality of stripping settlers where the stripped organic solvent is separated from the partially loaded raffinate. The stripped organic solvent is recycled to one of the plurality of extraction mixers. The aqueous ferric chloride solution is further processed to form a concentrated ferric chloride solution to provide a recyclable etchant solution.

DETAILED DESCRIPTION OF THE PREFERRED EMBODIMENT

Figure 1A:
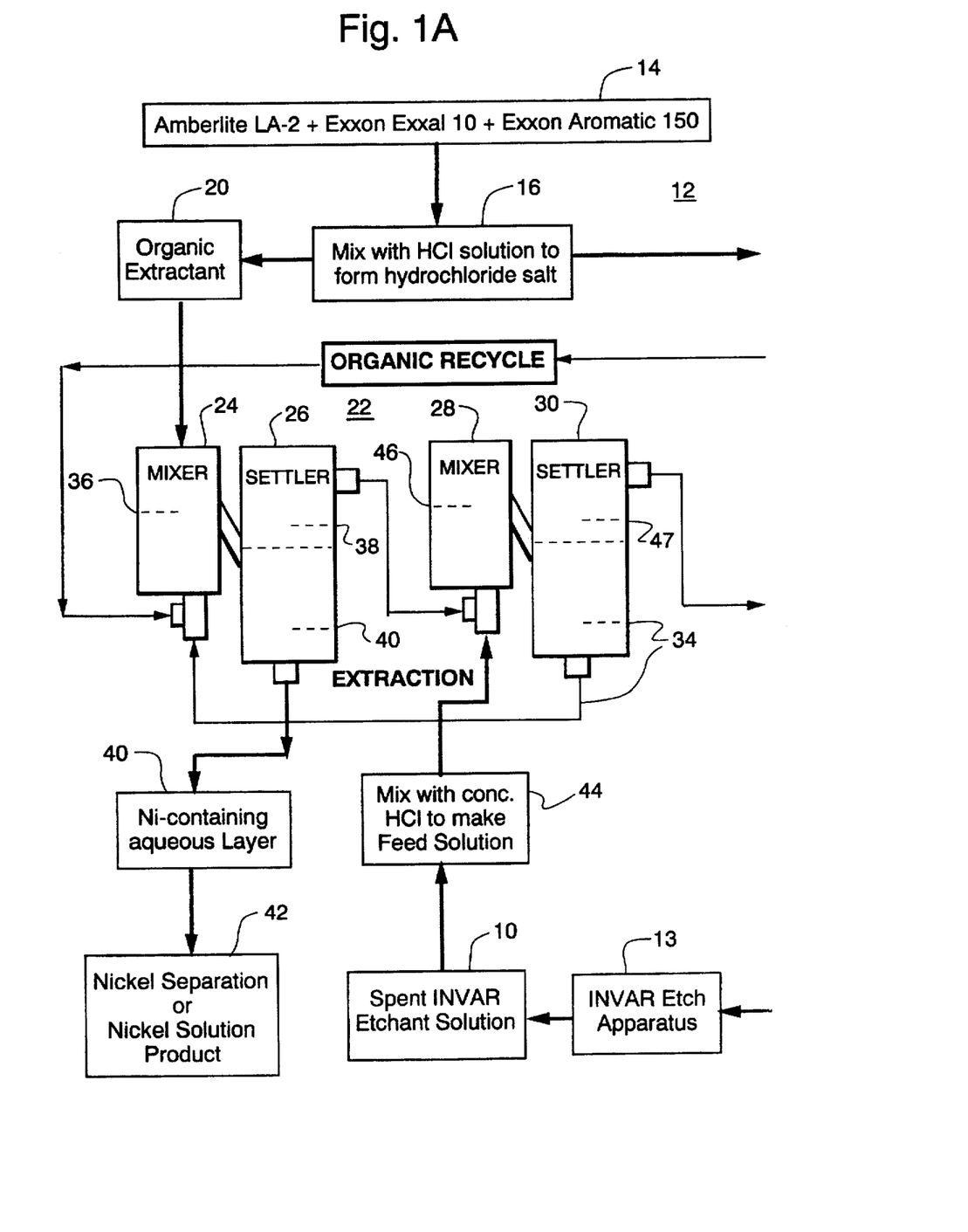
FIGS. 1A and 1B are partial views forming a complete view of a block diagram of the present solvent extraction process.
Figure 1B:
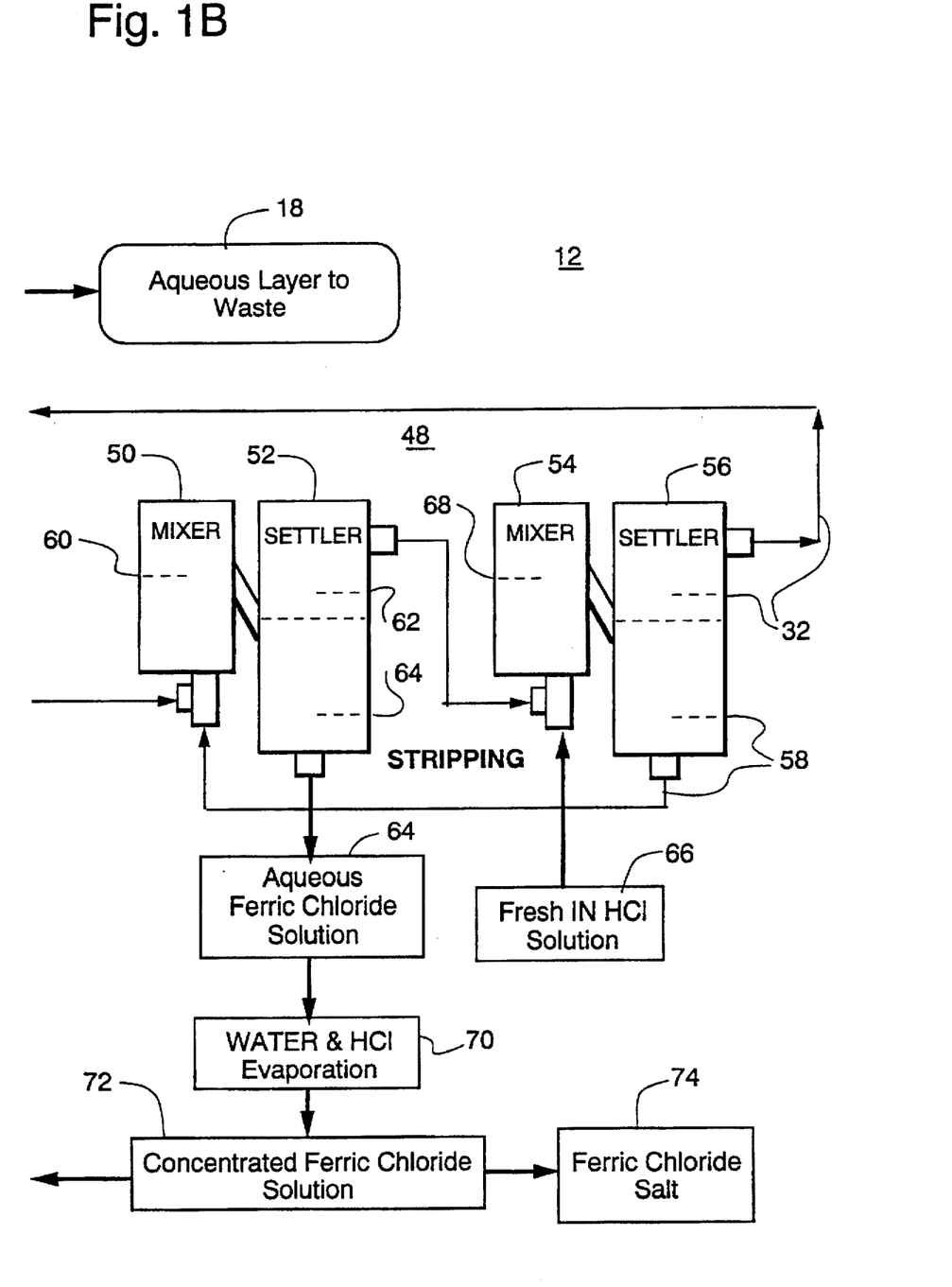

FIGS. 1A and 1B show a block diagram of the present method for separating ferric chloride from nickel chloride in a spent INVAR™ etchant solution 10 utilizing a solvent extraction system 12. The spent etchant solution 10 is generated in an INVAR™ etch apparatus 13, such as that shown in U.S. Pat. No. 4,482,426, to Maynard et al. An extractant solution 14, comprising an amine, such as AMBERLITE LA-2, produced by Rohm & Haas, Philadelphia, Pa., and a solvent, such as kerosene, is formed.

The AMBERLITE LA-2 is the active extractant and the kerosene is the diluent. However, AMBERLITE LA-2, alone, is not effective and additive materials and conditions are required for an effective separation process. The kerosene used in the extractant solution 14 may be either aliphatic or aromatic. However, aliphatic kerosene forms a three phase system that interferes with the extraction process and isodecanol, available as EXXAL 10 from Exxon Co., Houston, Tex., is known to inhibit the formation of the third phase. Aromatic kerosene does not form a third phase and is, therefore, preferred. EXXON AROMATIC 150 kerosene is available from Exxon Co., Houston, Tex. The extractant solution 14 is mixed with an HCl solution 16. The resultant organic extractant 20, comprising the kerosene and a hydrochloride salt of the AMBERLITE LA-2 amine, is formed, as well as an aqueous layer 18, which is discarded as waste. The organic extractant 20 is introduced into an extraction section 22 of the solvent extraction system 12. The extraction section 22 includes a first extraction mixer 24, a first extraction settler 26, a second extraction mixer 28 and a second extraction settler 30. The organic extractant 20 is mixed, for example by stirring, in the first extraction mixer 24, with a stripped organic solvent 32 from a second stripping settler 56 and a first raffinate 34 from the second extraction settler 30 to form a first mixture 36. The first mixture 36 is passed to the first extraction settler 26 where the first mixture is separated into a first organic layer 38 and a Ni-containing aqueous layer, or second raffinate, 40 which is separated for future processing of the Ni-products. A feed solution 44, consisting of the spent etchant solution 10 and concentrated HCl, is formed and introduced into the second extraction mixer 28 where it is combined with the first organic layer 38 from the first extraction settler 26 to form a second mixture 46. The second mixture 46 is passed into the second extraction settler 30 where it is separated into the first raffinate 34, which is recycled to the first extraction mixer 24, and a loaded organic solution 47 having a high concentration of iron. The loaded organic solution 47 is introduced into a stripping section 48 of the system 12 comprising a first stripping mixer 50, a first stripping settler 52, a second stripping mixer 54 and the second stripping settler 56. The loaded organic solution 47 is mixed in the first stripping mixer 50 with a partially loaded raffinate 58 from the second stripping settler 56 to form a third mixture 60. The third mixture 60 is passed to the first stripping settler 52 wherein the third mixture is separated into a partially stripped organic layer 62 and an aqueous ferric chloride solution 64 which is further processed, as described hereinafter. A 1 N HCl solution 66 is formed and introduced, along with the partially stripped organic layer 62, into the second stripping mixer 54 to form a fourth mixture 68. The fourth mixture 68 is passed to the second stripping settler 56 where the stripped organic solvent 32 is separated from the partially loaded raffinate 58. The stripped organic solvent 32 is recycled to the first extraction mixer 24.

The aqueous ferric chloride solution 64, obtained from the first stripping settler 52, is further processed by evaporating, in step 70, the water and additional HCl that were added to form the feed solution 44 and also added as the HCl solution 66. Evaporation occurs at a temperature in excess of 100° C., at atmospheric pressure. However, evaporation at a lower temperature can be achieved by reducing the pressure, thereby reducing the energy requirements of the system. The resultant concentrated ferric chloride solution 72 may be recycled as an etchant for INVAR™ shadow masks in a continuous processing system, such as the INVAR™ etch apparatus 13, or the concentrated ferric chloride solution 72 may be dried to provide a ferric chloride salt 74 in a non-continuous system.

EXAMPLE

A sample of 100 ml of a spent ferric chloride etchant 10, having a 5.4% concentration of nickel, is mixed with 35 ml of 12 molar HCl to form the feed solution 44. This HCl addition dilutes the iron and nickel levels from 270.2 mg/ml and 15.5 mg/ml, respectively, in the ferric chloride etchant 10, to 200.1 mg/ml and 11.4 mg/ml, respectively, in the feed solution 44. The excess HCl favors the formation of [FeCl$_4$]$^{-1}$ as the dominant iron species in solution. The AMBERLITE LA-2 amine extracts iron as [FeCl$_4$]$^{-1}$ from an HCl solution.

An extractant solution 14, containing 187 g of AMBERLITE LA-2 and 187 g of EXXON EXXAL 10 alcohol (isodecanol) is diluted to one liter with EXXON AROMATIC 150 kerosene as the solvent. The isodecanol is optional for use with an aromatic kerosene, but is recommended with an aliphatic kerosene in order to inhibit the formation of a third phase which would inhibit the extraction process.

The design of a solvent extraction system can be predicted using extraction and stripping isotherms which represent equilibrium situations. These isotherms predict the best recovery and stripping that can be obtained. Extraction isotherm data are generated by contacting the organic extractant solution 20 with the feed solution 44 at various organic to aqueous (O/A) volume ratios. The aqueous feed solution 44, before extraction, contains both iron and nickel. After phase separation, the organic and aqueous layers are analyzed for metal content. The data for the extraction isotherm are contained in TABLE 1.

TABLE 1

| | EXTRACTION ISOTHERM | | | |
|---|---|---|---|---|
| | Fe (mg/ml) | | Ni (mg/ml) | |
| O/A | Aqueous | Organic | Aqueous | Organic |
| 11.1/1 | 15.5 | 13.8 | 15.7 | 0.0016 |
| 7.4/1 | 34.2 | 18.4 | 15.8 | 0.0014 |
| 3.7/1 | 91.5 | 27.1 | 14.8 | 0.0017 |
| 1.5/1 | 153.2 | 33.8 | 14.0 | 0.0021 |
| 1/1 | 165.7 | 36.4 | 13.8 | 0.0025 |
| Stripped Organic (32) | — | 0.93 | — | 0.0007 |
| Feed Solution (44) | 200.1 | — | 11.4 | — |
| Spent Etchant (10) | 270.2 | — | 15.4 | — |

Figure 2:
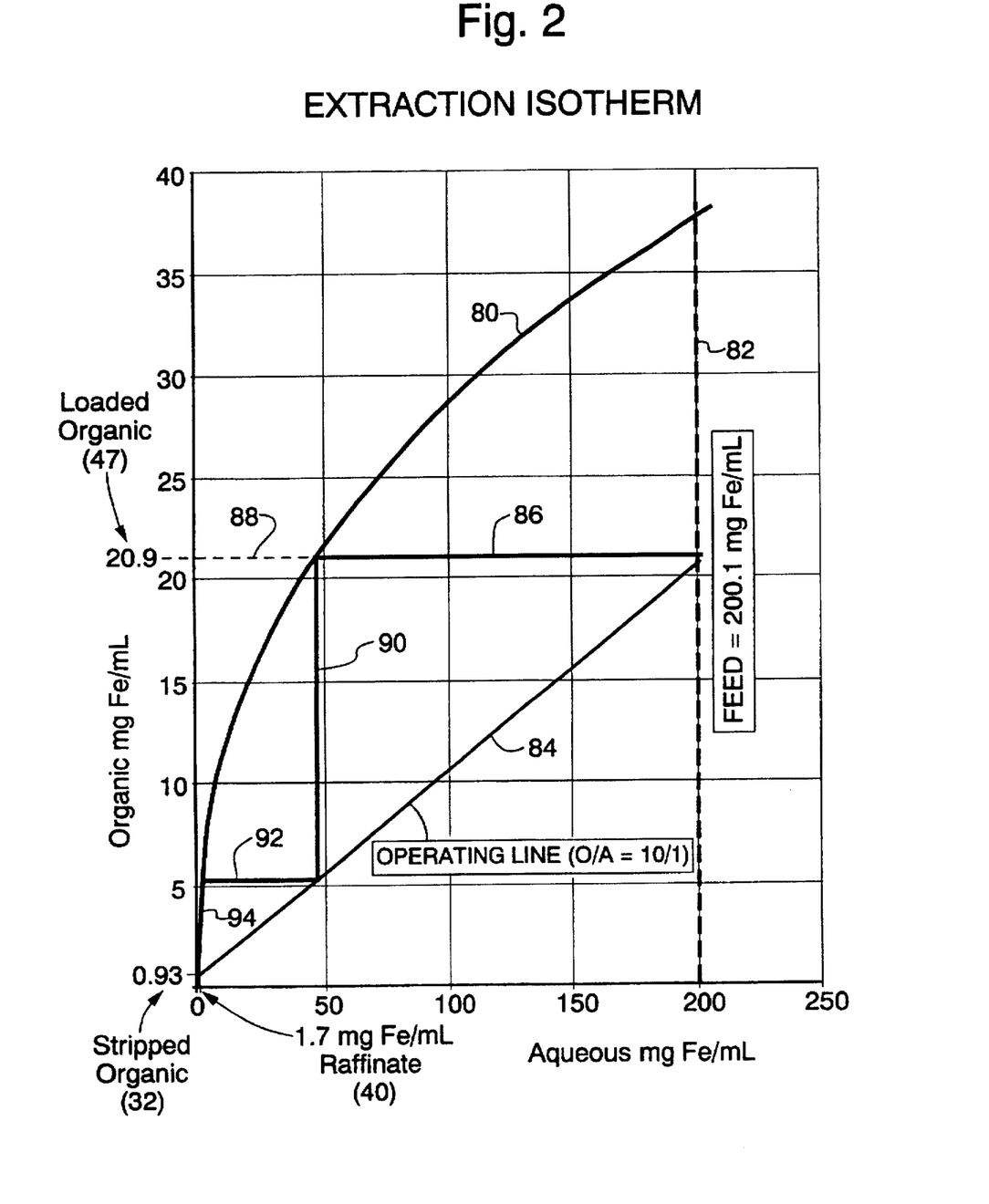
FIG. 2 is an extraction isotherm having a first set of operating parameters used to design a solvent extraction portion of the extraction process.

The aqueous phase metal concentration (abscissa) versus the organic phase metal concentration (ordinate) is plotted, in FIG. 2, for the data points of TABLE 1 and a curve 80 that best fits the data provides the extraction isotherm. The extraction isotherm curve 80 is extrapolated towards the origin and also towards a vertical line 82 that represents the iron concentration of the feed solution 44, which in this example is 200.1 mg Fe/ml. An operating line 84 is then constructed. One end of the operating line 84 is located on the extraction isotherm curve 80, and has a value of 0.93 mg Fe/ml, equal to the iron concentration of the stripped organic solvent 32. The other end of the operating line 84 intersects the vertical line 82. The slope of the operating line 84, is established for an O/A ratio within the range listed in TABLE 1, for example a ratio of 10/1. However, other O/A ratios are within the scope of the present invention. Then, a horizontal solid line 86 is extended, from the point of intersection of operating line 84 with the vertical line 82, to the extraction isotherm curve 80. The horizontal line 86 is extrapolated, as dashed line 88, to intersect the ordinate. The point of intersection of line 88 and the ordinate predicts that the iron concentration of the "loaded" organic solution 47 is about 20.9 mg Fe/ml. A vertical line 90 is then dropped from the intersection of extraction isotherm curve 80 and horizontal line 86 to operating line 84. A second horizontal line 92 is constructed to intersect the extraction isotherm curve 80 and a second vertical line 94 is extended to the operating line 84, thereby creating "steps". By extending the second vertical line 94 to the abscissa, it can be determined that the iron content of the second raffinate, which is described herein as the Ni-containing aqueous layer 40, is about 1.7 mg Fe/ml. Thus, the second raffinate 40 has a high ratio of nickel to iron and can be further processed to obtain high purity nickel as a salable commodity. Each triangular step constructed by this method represents a single stage of extraction. Because there are two triangles, or steps, under the extraction isotherm curve 80, and the iron content of the feed solution 44 is reduced from 200.1 mg Fe/ml to 1.7 mg Fe/ml in the second raffinate 40, the data predict that two extraction steps will remove about 99% of the iron from the feed solution. The iron removed from the feed solution is now contained in the "loaded" organic solution 47, which derives its name from the increased amount of iron in the solution.

In this example, stripping isotherm data are generated by preparing a loaded organic solution 47, and stripping the loaded organic solution using a 1N HCl solution at various O/A ratios, separating the phases, and analyzing each phase for metal content. The loaded organic solution 47 is prepared by mixing 1 liter of the organic extraction solution 20 with 135 ml of the feed solution 44. After separating the aqueous layer, the loaded organic solution 47 is clarified. The loaded organic solution 47 is stripped using the 1N HCl solution 66 at O/A volume ratios of 5/1, 2/1, 1/1 and 1/2. Each organic and aqueous solution is analyzed for iron and nickel content and the data for the stripping isotherm are contained in TABLE 2.

TABLE 2

| | STRIPPING ISOTHERM | | | |
|---|---|---|---|---|
| | Fe (mg/ml) | | Ni (mg/ml) | |
| O/A | Aqueous | Organic | Aqueous | Organic |
| 5/1 | 44.7 | 10.7 | N.D.* | 0.0011 |
| 2/1 | 25.5 | 6.0 | N.D.* | 0.0016 |
| 1/1 | 14.4 | 3.3 | N.D.* | 0.0010 |
| 1/2 | 7.4 | 1.4 | N.D.* | 0.0008 |
| Loaded Organic (47) | — | 20.7 | — | 0.0017 |
| Aqueous (1N HCl) | 0 | — | 0 | — |

*N.D. = none detected

The iron content of the loaded organic solution 47 which was predicted by the extraction isotherm, FIG. 2, to be 20.9 mg Fe/ml was measured as 20.7 mg Fe/ml, providing good agreement between measured and predicted values.

Figure 3:
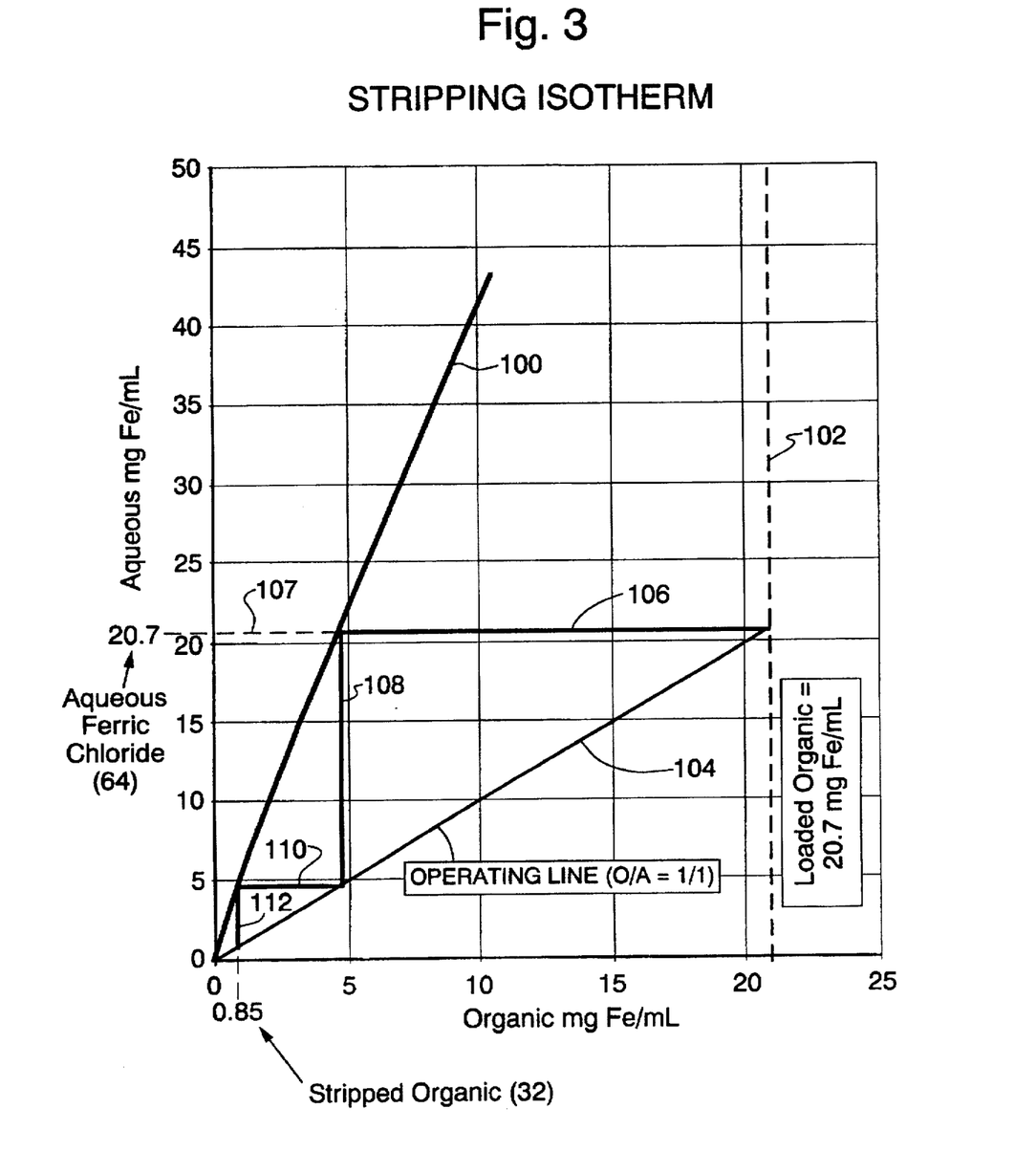
FIG. 3 is a stripping isotherm having a first set of operating parameters used to design a stripping portion of the extraction process.

In FIG. 3, the organic phase metal concentration (abscissa) versus the aqueous phase metal concentration (ordinate) is plotted for the data points of TABLE 2, and curve 100, that best fits the data, provides the stripping isotherm. The stripping isotherm curve 100 is extrapolated towards the origin. A vertical line 102, which represents the measured iron concentration in the loaded organic solution 47, in this instance 20.7 mg Fe/ml, is drawn upward from the abscissa. An operating line 104 is constructed with one end located at the origin and the other end intersecting the vertical line 102. In FIG. 3, the slope of the operating line 104 is established for an O/A ratio of 1/1, which is within the range of O/A values in TABLE 2. However, other O/A ratios are within the scope of the present invention. Again with reference to FIG. 3, a first horizontal line 106 is extended from the point of intersection of operating line 104 with the vertical line 102 to the stripping isotherm curve 100. The horizontal line 106 is extrapolated, as dashed line 107, to intersect the ordinate. The point of intersection predicts that the iron concentration of the aqueous ferric chloride solution 64 will be about 20.7 mg Fe/ml, for an O/A ration of 1/1. A vertical line 108 is dropped from the intersection of line 106 and stripping isotherm curve 100 to the operating line 104. A second horizontal line 110 is constructed from the operating line 104 to the stripping isotherm curve 100. A third vertical line 112 is dropped from the intersection of line 110 and curve 100 to the operating line 104. An extension of line 112 to the abscissa provides the concentration of iron in the stripped organic solution 32 for an O/A ratio of 1/1. With an O/A ratio of 1/1, the stripping isotherm curve 100 shows that two stripping steps are required to reduce the iron content from 20.7 mg Fe/ml for the loaded organic solution 47 to 0.85 mg Fe/ml for the stripped organic solution 32. Thus, two stripping steps remove about 95.9% of the iron from the loaded organic solution 47.

Figure 4:
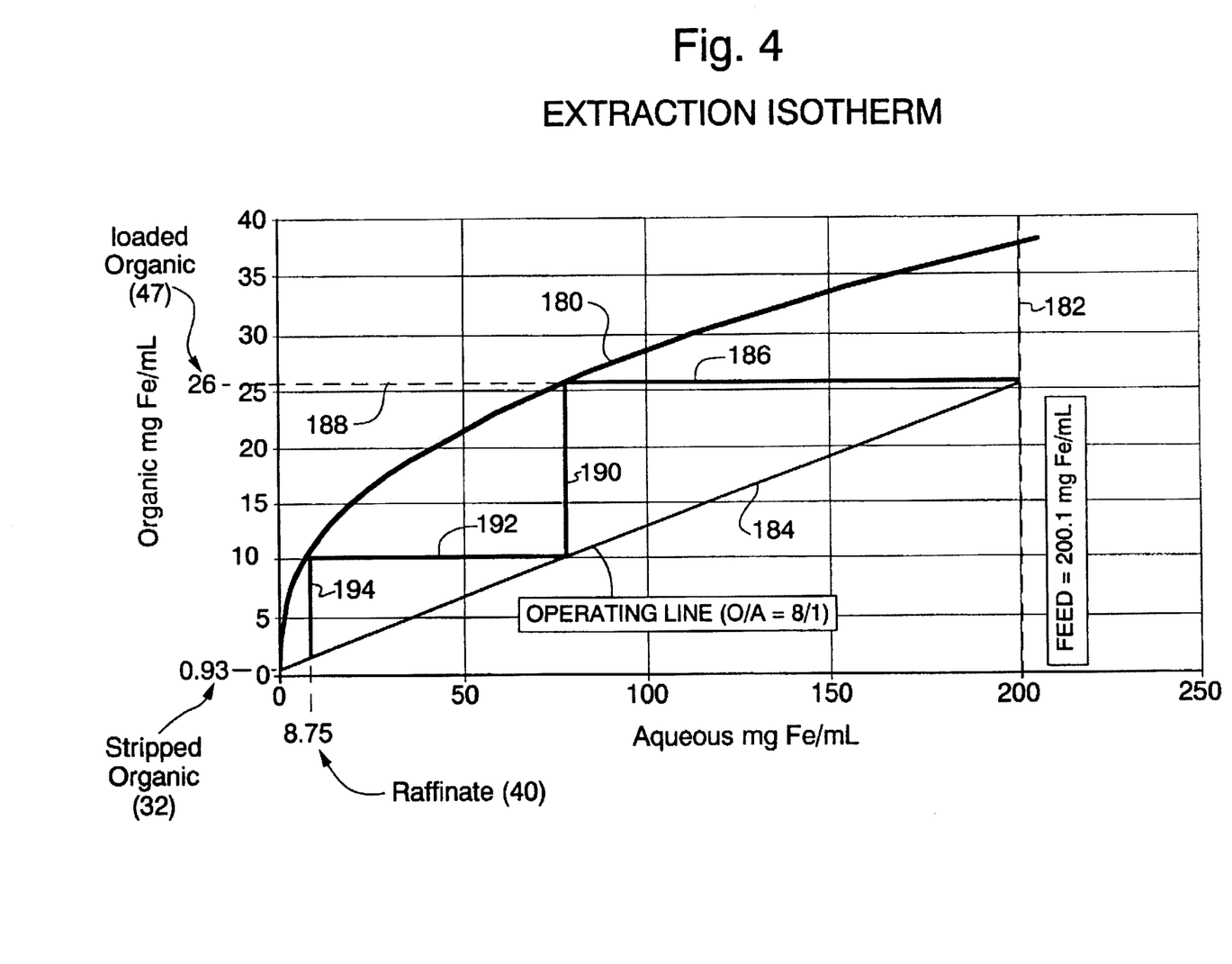
FIG. 4 is an extraction isotherm having an operating line different from that of FIG. 2.

The usefulness of the extraction and stripping isotherms can be demonstrated by utilizing the data of TABLES 1 and 2, but assuming different O/A ratios for the operating lines in each diagram. In FIG. 4, the extraction isotherm curve 180 is plotted for the data of TABLE 1 and extrapolated towards the origin. A first vertical line 182 is constructed at the concentration (200.1 mg Fe/ml) of the feed solution 44. An operating line 184 is constructed with one end located on the extraction isotherm curve 180, at 0.93 mg Fe/ml, the concentration of the stripped organic 32. The other end of the operating line 184 intersects line 182 with a slope having an O/A ratio of 8/1. A first horizontal line 186 is extended from the point of intersection of operating line 184 with the vertical line 182 to the extraction isotherm curve 180. The line 186 is extrapolated, as dashed line 188, to intersect the ordinate. The point of intersection of line 188 and the ordinate predicts that the iron concentration of the loaded organic solution 47 is about 26 mg Fe/ml, which is greater than in the previous example for an O/A ratio of 10/1. A second vertical line 190 is dropped from the intersection of the extraction isotherm curve 180 and horizontal line 186 to the operating line 184. A second horizontal line 192 is constructed to intersect the extraction isotherm curve 180, and a third vertical line 194 is extended to the operating line 184. By extending the third vertical line 194 to the abscissa, it can be determined that the iron content of the second raffinate 40 is about 8.75 mg Fe/ml. Thus, with an O/A ratio of 8/1, the second raffinate 40 has more iron than with an O/A ratio of 10/1. Thus, if it is desirable to utilize the raffinate, for example to further extract the nickel for sale, then an O/A ratio of 10/1 yields a higher ratio of nickel to iron than an O/A ratio of 8/1. Nevertheless, in the present example, with an O/A ratio of 8/1, two extraction steps will remove only about 95.6% of the iron from the feed solution 44, the balance being in the raffinate 40.

Figure 5:
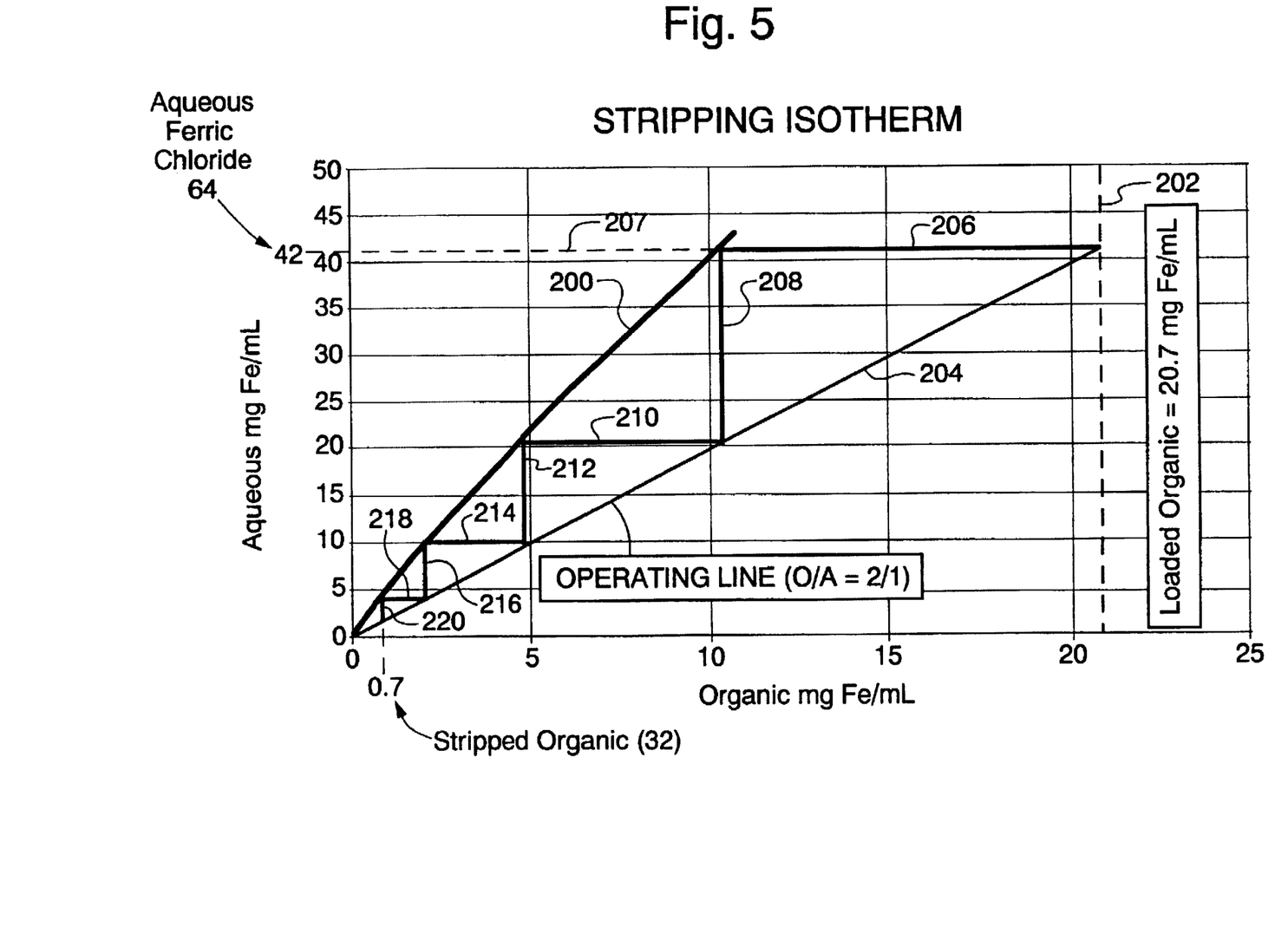
FIG. 5 is a stripping isotherm having an operating line different from that of FIG. 3.

A stripping isotherm 200, created using the data from TABLE 2, but with an operating line having an O/A ratio of 2/1, requires four steps to achieve substantially the same iron concentration in the stripped organic solution 32. As shown in FIG. 5, The stripping isotherm curve 200 is extrapolated towards the origin. A first vertical line 202, representing an iron concentration of 20.7 mg Fe/ml in the loaded organic solution 47, is constructed upward from the abscissa. An operating line 204 is constructed with one end located at the origin and the other end intersecting the vertical line 202. The slope of the operating line 204 is established for an O/A ratio of 2/1, which is within the range of O/A values in TABLE 2. A first horizontal line 206 extends from the point of intersection of operating line 204 with the vertical line 202 to the stripping isotherm curve 200. The horizontal line 206 is extrapolated, as dashed line 207, to intersect the ordinate. The point of intersection predicts that the iron concentration of the aqueous ferric chloride solution 64 will be about 42 mg Fe/ml for an O/A ration of 2/1. A second vertical line 208 is dropped from the intersection of line 206 and curve 200 to the operating line 204. A second horizontal line 210 is constructed from the operating line 204 to the stripping isotherm 200. A third vertical line 212 is dropped from the intersection of line 210 and curve 200 to the operating line 204. A third horizontal line 214 is extended from operating line 204 to the stripping isotherm curve 200. A fourth vertical line 216 is dropped from the intersection of line 214 and curve 200 to the operating line 204. A fourth horizontal line 218 is constructed from the operating line 204 to the stripping isotherm 200. A fifth vertical line 220 is dropped from the intersection of line 218 and curve 200 to the operating line 204. An extension of line 220 to the abscissa provides the concentration of iron in the stripped organic solution 32 for an O/A ratio of 2/1. With an O/A ratio of 2/1, the stripping isotherm curve 200 shows that four stripping steps are required to reduce the iron content from 20.7 mg Fe/ml for the loaded organic solution 47 to 0.7 mg Fe/ml for the stripped organic solution 32.

The foregoing analysis demonstrates that the proper choice of O/A ratio in the extraction section 22 and in the stripping section 48 can optimize the operation of the extraction system 12. Changing the O/A ratio in the extraction section 22 results in a variation of the concentration of iron in the loaded organic solution 47 and in the second raffinate 40. Also, by operating the stripping section 48 with an O/A ratio of 1/1, only two stripping steps are required to remove about 95.9% of the iron from the loaded organic solution 47 to provide a stripped organic solution 32 having an iron content of about 0.85 mg Fe/ml. However, when the stripping section 48 is operated at an O/A ratio of 2/1, four stripping steps are required to remove 96.6% of the iron to obtain a stripped organic solution 32 having an iron content of about 0.7 mg Fe/ml. Thus, the two additional stripping steps provide an increase in iron content in the stripped organic solution 32 of less than one percent. The aqueous ferric chloride solution 64 produced in the stripping section 48 of the extraction system 12 also varies in iron concentration, depending on the O/A ratio utilized. For an O/A ratio of 1/1, the iron concentration of the ferric chloride solution 64 is about 20.7 mg Fe/ml, whereas for an O/A ratio of 2/1 the iron concentration increases to about 42 mg Fe/ml.

Therefore, the solvent extraction system 12 can be adjusted to optimize either the purity of the nickel in the second raffinate 40 or the proportion of ferric chloride extracted and recycled, by adjusting the extraction and stripping O/A ratios. The selection of the O/A ratio, and the resultant number of stripping steps, depends not only on the desired iron concentration of the various solutions produced in the system 12, but also on economic considerations such as the cost of adding additional equipment needed for an increased number of processing steps, as well as the cost of operating the system.

What is claimed is:

1. A method of separating ferric chloride from nickel chloride in a spent etchant solution utilizing a solvent extraction system, comprising the steps of:

providing an extractant solution consisting of an active extractant and a diluent;

mixing said extractant solution with an HCl solution to form an aqueous layer, which is discarded, and an organic extractant comprising the diluent and a hydrochloride salt of the active extractant;

introducing said organic extractant into an extraction section comprising a plurality of extraction mixers and extraction settlers, said organic extractant being mixed in one of said plurality of extraction mixers with a recycled, stripped organic solvent and a first raffinate from one of said plurality of extraction settlers to form a first mixture;

passing said first mixture to a different one of said plurality of extraction settlers wherein said first mixture is separated into a first organic layer and a Ni-containing second raffinate;

forming a feed solution consisting of said spent etchant solution and concentrated HCl;

introducing said feed solution into a different one of said plurality of extraction mixers where it is combined with said first organic layer from said different one of said plurality of extraction settlers to form a second mixture;

passing said second mixture into said one of said plurality of extraction settlers where it is separated into said first raffinate and a loaded organic solution having a high concentration of iron;

said loaded organic solution being introduced into a stripping section comprising a plurality of stripping mixers and stripping settlers, said loaded organic solution being mixed in one of said plurality of stripping mixers with a partially loaded raffinate from one of said plurality of stripping settlers to form a third mixture;

passing said third mixture to a different one of said plurality of stripping settlers wherein said third mixture is separated into a partially stripped organic layer and an aqueous ferric chloride solution;

forming a 1N HCl solution;

introducing said 1N HCl solution and said partially stripped organic layer into a different one of said plurality of stripping mixers to form a fourth mixture;

passing said fourth mixture to said one of said plurality of stripping settlers where said stripped organic solvent is separated from said partially loaded raffinate and recycled to said one of said plurality of extraction mixers; and processing said aqueous ferric chloride solution to form a concentrated ferric chloride solution.

2. The method as described in claim 1, wherein said active extractant of said extractant solution is an amine and said diluent is selected from the group consisting of aliphatic kerosene and aromatic kerosene.

3. The method as described in claim 2, where said extractant solution further includes a third phase inhibitor.

4. The method as described in claim 3, wherein said third phase inhibitor is isodecanol.

* * * * *